United States Patent [19]

Lusignan et al.

[11] Patent Number: 4,571,723
[45] Date of Patent: Feb. 18, 1986

[54] PULSE CODE MODULATED DIGITAL TELEPHONY TONE GENERATOR

[75] Inventors: Bruce B. Lusignan, Palo Alto; James Sytwu, Sunnyvale; Amr Badawi, Stanford, all of Calif.

[73] Assignee: Board of Trustees of the Leland Stanford Junior University, Stanford, Calif.

[21] Appl. No.: 545,078

[22] Filed: Oct. 24, 1983

[51] Int. Cl.[4] .......................... H04J 3/12; H04M 1/00
[52] U.S. Cl. .............................. 370/110.2; 179/84 VF
[58] Field of Search ......................... 370/110.2, 110.3; 179/84 VF

[56] References Cited

U.S. PATENT DOCUMENTS

| | | | |
|---|---|---|---|
| 3,706,855 | 12/1972 | Pitroda et al. | 370/110.2 |
| 3,870,826 | 3/1975 | Carbrey et al. | 370/110.2 |
| 4,110,562 | 8/1978 | Moed | 370/110.2 |
| 4,205,203 | 5/1980 | Mehta et al. | 370/110.2 |

FOREIGN PATENT DOCUMENTS 2103039 7/1981 United Kingdom ............. 370/110.2

Primary Examiner—Douglas W. Olms
Assistant Examiner—Frank M. Scutch, III
Attorney, Agent, or Firm—Flehr, Hohbach, Test, Albritton & Herbert

[57] ABSTRACT

A tone generator is disclosed comprising an LSI controller and read only memory to provide any one of a pre-established set of audio signals to a standard pulse code modulated data stream. This is accomplished utilizing the origination address and destination address that appear on the origination and destination buses in every cycle of data. The origination address designates any one of the pre-established signal patterns stored in the ROM. The designated signal is read onto the data bus by the disclosed signal generating system by reading out the elements of the signal tone stored in the ROM. The predefined tones are stored continuously and re-generated continuously by the controller; thus, each tone is available during each frame cycle to be read out when the origination address calls for the tone. The samples of the tones and signals are stored in the ROM in the digital form they will have on the PCM data bus. The destination address defines the point to which the designated tone signal will be transferred. It is only necessary to store enough data for each signal to complete one nonrepeating cycle; the first 64 words (2 bytes each) in the ROM designate the number of samples stored for each signal so that the controller knows where signal table starts in the ROM. Transmission of a complete tone is accomplished in the LSI controller's circuit by incorporating a counter therein which increments the address of each tone every frame, and stores it on the chip RAM to be retrieved in the next frame to read the next of the sample of the tone. As the controller senses the predefined end of each tone, the counter is reset to the starting address of that particular tone. The instantaneous value of each tone is stored in an output register in the controller to begin transmission of the tone immediately if an origination address or addresses request it. Several tones can be addressed simultaneously within the same time frame, and the tone addressed by the controller can be varied every 488 nanoseconds with the sample sent to a different destination.

11 Claims, 1 Drawing Figure

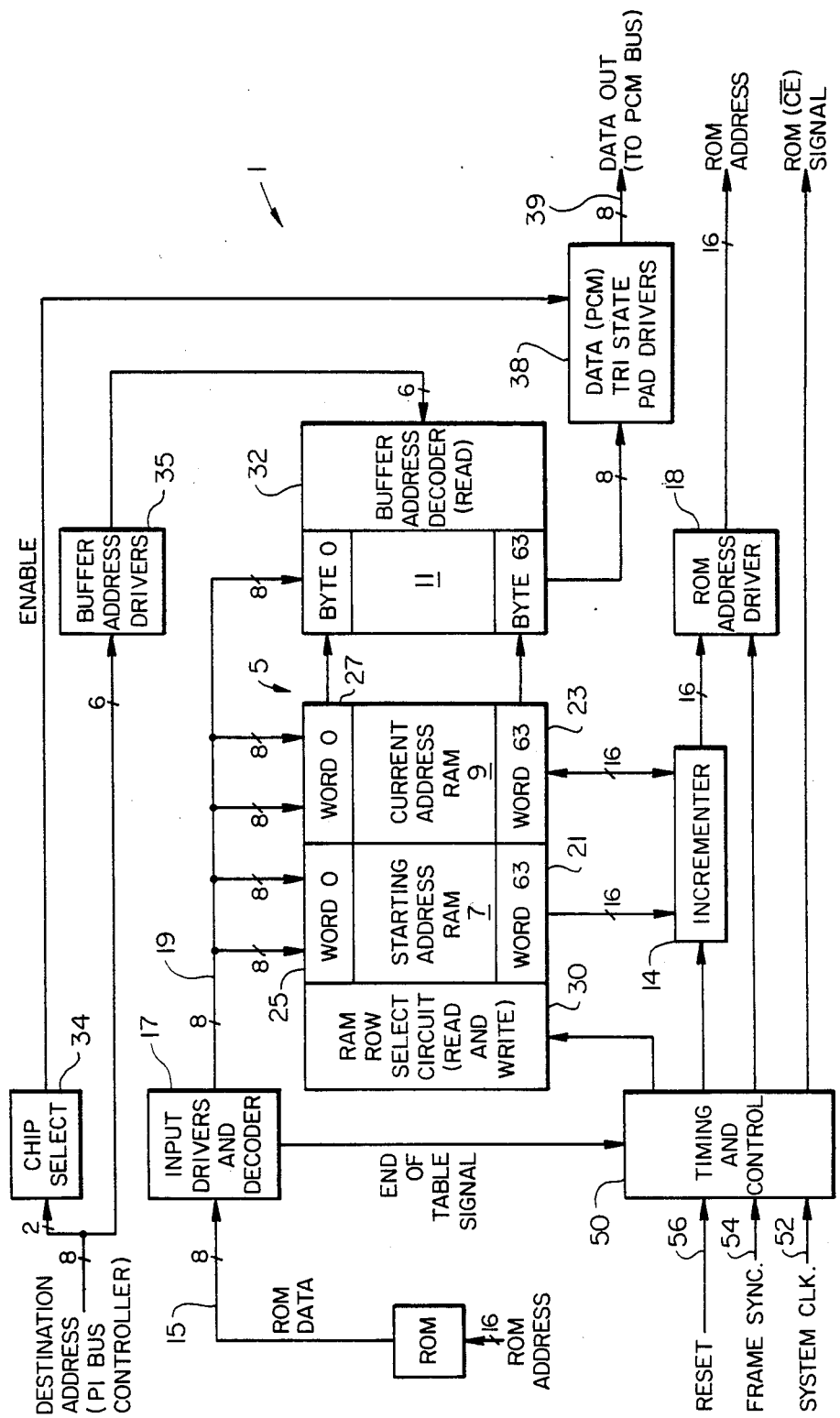
FIG_1

PULSE CODE MODULATED DIGITAL TELEPHONY TONE GENERATOR

The subject invention is directed to a combination of a read only memory and a controller chip for generating time waveforms in a pulse code modulated format in response to the originating addresses from an outside system. The generated waveforms can be transmitted simultaneously to a large number of different destinations. The digitized samples of the waveforms are stored in the read only memory, and accessed by a control code formulated by the controller. The number of samples of each waveform waveform varies. The read only memory also stores, for each waveform, two bytes designating the first address of the digital signal representing that particular waveform and an end of table signal as the last byte in each waveform table. As currently designed, the controller chip continuously stores (1) one sample of each of the sequences of samples making up a given repetitive waveform to be transmitted; (2) the address (i.e., current address) in ROM of each of those samples, and (3) the starting address in ROM of each of the sequence of samples comprising the waveforms.

There is an expanding need for the generation of time waveforms particularly in digital telephone switches. A time signal or waveform as used in such applications typically comprises a number of different frequency sine waves combined together in certain magnitudes and phases. In prior art signal generation, individual frequency components were generated and combined to form the desired waveforms.

This technique, while widely used, depended on building frequency oscillators that would generate the required frequencies adaquately and accurately, and analog mixers to combine these components in the correct ratios and phase to obtain the needed signal. Regular adjustment and routine maintenance was required to maintain such components operable and accurate. This implies high production and/or maintenance costs, plus inconvenience due to the instability problems of high accuracy analog circuits.

A new course of action was adopted with the introduction of sampling theory. According to the theory, any time signal can be reconstructed using samples taken at equal intervals in combination with appropriate low pass filtering techniques. The technique led to the use of digital signals in communications, wherein the time signals are sampled, encoded and transmitted in binary form. At the receiving end, the signals can be decoded and filtered to reconstruct the original signal.

In telephony applications, to which the subject invention is especially addressed, pulse code modulation (PCM) is widely accepted as a general coding technique for digital telephony. In PCM all speech waveforms and signals are sampled, digitized and transmitted as described before using sampling theory. According to the Nyquist theorem, the sampling rate should be twice that of the highest frequency component in order to avoid misconstruction of the signal. In telephone applications the speech bandwidth used is less than 3.4 kilohertz; this produces acceptable voice at the other end. Thus, the sampling rate for the PCM system used in telephony has been set a standard 8 kilohertz.

Each analog sample is converted to an eight-bit binary code using a standard logarithmic conversion formula to achieve best resolution. Two conversation standards, "u-law" and "A-law", are commonly used in the telephone industry.

In a digital telephone connection then, one eight-bit sample of voice is transferred every 125 $\mu$ seconds (1/8000th of a second). In a system where many voice paths are interconnected simultaneously each 125 $\mu$ seconds are further subdivided into smaller time intervals so that multiple signals can be transmitted at the same time. This process is termed time division multiplexing (TDM). To transmit 32 voice paths, for example, the 125 $\mu$ second is divided into 3.9 $\mu$ sec intervals (125 $\mu$/32). During each 3.9 $\mu$]sec interval one of the 32 channels is transmitted. After completing the 32 channels, the sequence begins again. Thus each of the 32 channels would be transmitted once every 125 $\mu$ sec. With 256 channels the 125 $\mu$ sec would be divided into 0.488 $\mu$ sec intervals and a different channel transmitted every 0.488 $\mu$ sec.

The inventors herein concluded that there would be considerable advantage for a single device that would be able to generate digitally any of the signals commonly used in telephone applications and to supply them simultaneously to any of the voice channels combined on a TDM circuit. The circuit that does this generated the appropriate eight-bit sample for each of 64 different signals once every 125 $\mu$ sec. These 64 samples are stored in buffers that can be read to a TDM circuit in any order, one sample each 0.488 $\mu$ sec. Thus any of the 64 signals can drive any of 255 different telephone lines combined on a TDM circuit. (The 256th channel is commonly used for control purposes and does not require signaling.)

Thus, it is the object of the invention to provide in effect a digital waveform generator comprising a read only memory (ROM) of sufficient size to store the digitized samples of a plurality of frequently used waveforms together with a controller that retrieves periodically a sample of each of the stored waveforms from the ROM at correct intervals and stores it on board the controller chip in a buffer memory. In response to an originating address which selectively defines a single one of the previously digitized waveforms, that waveform is immediately selected by the controller from the buffer memory and the full eight-bits of information, which comprises a single segment of the waveform, is transmitted to the defined remote location, one sample at a time. Further, because of the immediate availability in the buffer memory of samples of each of the 64 stored tones, any stored tone can be transmitted to as many as 255 different destination addresses during each 125 $\mu$ sec interval, each transmission requiring 0.488 $\mu$ sec. It should be noted, that although the maximum sampling rate for a PCM system is 8 kilohertz, for tones consisting of pure sine waves the number of signals needing to be stored is far less than 8,000, since signals repeat themselves after a time period that depends on the sampling frequency and the heat between the basic waveform components. The ROM size in this invention is minimized by enabling each of the 64 tones to be stored with a different number of samples, that number being the minimum required for the repeating cycle of the individual tone. The ROM size needed to store all waveform information is defined by the number of signals needed to represent each non-repeating segment; the size of typical segment stores shall be discussed in detail below.

This system takes advantage of large size ROM's that are available at very reasonable prices. It should be understood that the speed of presently available ROMS doesn't match the speed needed by the PCM time multiplex bus. To overcome this limitation, a fast access buffer in the controller stores one sample of each of the 64 waveforms stored in the ROM. These samples are updated on a regular basis every 125 $\mu$ sec, which is equal to the PCM sampling frequency, the buffer thereby making up for the difference in spaced between the ROM data access time and the PCM time multiplex transmission frequency.

In most digital telephone switches the flow of PCM data is routed by using three parallel data busses. One "PCM bus" carries the PCM data itself. A second, "origination bus", carries the address (a binary number) designating the circuit that should be reading out its data on to the "PCM bus" at a given time. The third, "destination bus", carries the address designating the circuit that should be reading in its data from thhe "PCM bus" at the same time. A switch controller normally provides a sequence of origination destination address pairs once each 125 $\mu$ seconds to cause the data to be read from one set of circuits onto the other set of circuits, thus providing the desired of interconnection. In a switch operating with 256 interconnections, one pair of origination destination addresses is provided every 0.488 $\mu$ sec. The tone generator is designed to interface with this type of digital switch design. The tone generator has one port (a set of input lines) that are to be connected to the "origination bus". This part decodes the values set on the "origination bus" from 0 to 63 as one of the 64 different tones to the generated. It then puts the sample from the selected tone in the output port that would be connected to the "PCM bus". The tone generator does this activity every 0.488 $\mu$ sec.

These and other objectives are achieved by the tone generator which is disclosed comprising an LSI controller and read only memory to provide any one of a pre-established set of audio signals to a standard pulse code modulated data stream. This is accomplished utilizing the origination address that appears on the origination bus in every cycle of data. The origination address designates any one of the pre-established signal patterns stored in the ROM. The designated signal is read onto the data bus by the disclosed signal generating system by reading out the elements of the signal tone stored in the ROM. The predefined tones are stored continuously and regenerated continuously by the controller; thus, each tone is available during each frame cycle to be read out when the origination address calls for the tone. The samples of the tones and signals are stored in the ROM in the digital from they will have no the PCM data bus. It is only necessary to store enough data for each signal to complete one nonrepeating cycle; the first 64 words (2 bytes each) in the ROM designate the number of samples stored for each signal so that the controller knows where signal table starts in the ROM. Transmission of a complete tone is accomplished in the LSI controllers's circuit by incorporating a counter therein which increments the address of each tone every frame, and stores it on the chip RAM to be retrieved in the next frame to read the next sample of the tone. As the controller senses the predefined end of each tone, the counter is reset to the starting address of that particular tone.

The instantaneous value of each tone is stored in a memory buffer in the controller to begin transmission of the tone immediately if an origination address or addresses request it. During each 125 $\mu$ sec frame any of the 64 toner samples can be addressed by the controller in any order during every 0.488 $\mu$ sec interval. By such addressing any of the 64 different tones can be sent continuously to any of 255 different channels, each channel represented by one of the 0.488 $\mu$ sec intervals in the 125 $\mu$ sec time frame.

The invention to be described below reduces significantly the need for oscillators and encoders and provides a system depending on digital techniques that needs no expensive adjustments in the tone generator of a telephony system, therefore saving considerable effect, hardware and cost. This system can be used to reproduce any signal which is repetitive at some reasonable frequency and can transmit it substantially simultaneously to a large number of destination addresses. It could also be used to reproduce voice messages whose maximum length depends on the size of the storing ROM.

To aid in the understanding of this invention, reference should be made to:

FIG. 1 which is a block diagram showing the basic relationship between the functional components of the controller chip which controls access to the waveform storing ROM and transmission of the tones waveforms across the PCM bus.

The controller chip shown in FIG. 1 comprises the following elements, all of which are individually well known in the art but which are interconnected or interrelated herein to provide a controller chip of unique capabilities for the transmission of various tones or other repetitive waveforms in the digital pulse code modulated format. In particular, a random access memory 5 is provided comprising three sections:

(a) a starting address portion 7 of (n times 16) bits for storing the starting addresses (SA) of the ROM (not shown) tone tables, wherein n is the number of different tones to be stored in ROM. In telephony systems, which is the preferred embodiment of this system, n will be equal to 64;

(b) a current address portion 9 comprising (n times 16) bits for storing the current addresses (CA) of the samples of the tones in ROM currently stored in a buffer memory 11 on the controller chip; this section 9 therefore also comprises the ROM pointer, i.e., pointing to the address in ROM currently being accessed; and (c) a buffer address portion 11 having (n times 8) bits for storing up-dated or current samples of the 64 different tones stored in the read only memory.

An incrementer 14 is provided comprising a counter. In the normal mode of controller operation, this incrementer 14 is used to constantly update each address in the current address random access memory 9; in the initialization mode of the controller, the starting address of each stored tone is transferred from the ROM to the starting address RAM 7 and to current address RAM 9. A ROM address driver 18 of 16 bit capacity utilizes the output of the incrementer 14 to address the offboard ROM (not shown) in which the tone signals are stored.

In the upper left portion of FIG. 1 can be seen the 8 output lines 15 carrying the ROM data from the tone storing ROM (not shown). This data is supplied to the input drivers indicated at 17 and thence via output lines 19 to the starting address memory 7. The other output lines 19 go into the current address memory 9 and the buffer address portion 11; these lines going to starting address memory 7 and current address memory 9 are needed only in the intialization phase to be described in detail below. The reason for showing 2 pairs of 8 lines is that the starting addresses of each of the stored tones required 16 bits and are stored in 2 consecutive bytes in the ROM. Each tone sample occupies one byte, or 8 bits. The other key portion of the system is the timing and control section 50 which consists of decoding logic (described below) and a 12 phase clock or timing the cycles of the read phase of the read only memory and initialization phase of the controller chip 1.

Considerable effect was also invested in an economical layout of the chip in order to minimize chip size and reduce, insofar as possible, interconnections between different portions of the chip in order to maximize the operating speed and minimize any noise as well as other layout problems. The random access memory 5 occupies the largest area in the chip and is therefore to be located in the middle of the chip. Since both the starting address memory 7 and current address memory 9 are using the same incrementer 14, the bits of the two RAM memory portions 7, 9 are staggered so that $sa_0$ is stored adjacent byte $ca_0$, $sa_1$ is adjacent $ca_1$ and so on. This eliminates the use of any large data buffer at the outputs of these two memory portions 7, 9, saving both time and area. It also allows for adjustment of the pitch of the incrementer pitches to match those of a double memory cells as is used in the memory 5, resulting in further simplification of the design procedure.

The output registers 21 and 23 of the memory portions 7, 9 are located at the bottom of the array and are directly connected to the cells of the incrementer 14. These registers 21, 23 are actually input/output registers; register 23 will latch the incremented current address, in order that it can be stored back in its proper location in memory 9 after incrementing.

Of course, the starting address memory 7 is normally simply refreshed. However, the controller chip 1 is laid out so that the memory 5 is accessed every frame and thus the contents of the memory 7 can be read into output register 21 and then written back every time it is read. A second pair of input registers 25, 27 is located at the top of the random access memory 5 to latch in the data which is coming in from the ROM (not shown) in the initialization phase. This saves a considerable amount of space, simplifies the chip structure and enhances its speed, since no 8 bit bus around the memory 5 is necessitated.

Special mention should also be made of the relationship between the RAM address decoder 17 and the inputs to the memory portions comprising starting address section 7 and current address section 9 of the memory 5. The design as established provides for sequential updating of all locations in the three parts of the memory simultaneously; thus input lines 19 are provided for use in the initialization phase, to the three memory portions starting address 7, current address 9 and buffer memory 11. A 64 bit shift register, one for identifying each of the selected words in the memory sections, 7, 9 and 11 can be found at the left of the memory 5 identifed by numeral 30. It addresses the 64 rows of memory 5, one at a time, and shifts once after each update cycle is finished. Thus, as to the layout of the clip, the read lines extend through the start address memory 7 and current address memory 9, but stop short of buffer memory 11. The use of the shift register 30 reduces access time and eliminates the use of a counter and decoder.

As to the reading procedure, the buffer memory 11 is accessed by an address decoder 32 which decodes 6 of the 8 bits of the destination address, received from a bus controller which is a part of the external system and not shown here.

The other 2 bits of the 8 bit address received from the bus controller are directed to a chip select logic module 34 to generate a read signal for the buffer memory 11. In response to receipt of a enable signal from this chip select device 34, the word identified by bus address decoder 32 is transmitted via drivers 38 to the data output bus 39 for transfer to the outgoing PCM bus (not shown). In this way, any of the tones stored in ROM can be addressed and transferred to any destination address at a frequency limited only by the bus controller speed (i.e., in this embodiment, at a 488 nanosecond rate); and the same tone or any of the tones having samples stored in the buffer memory 11 can be transferred to up to 255 different destinations over the PCM bus within the same time frame.

As the internal structure of the functional blocks previously identified, the incrementer 14 is a standard counter with only a minor modification to allow for parallel loading during phase 1 from either the starting address memory 7 or the current address memory 9 (depending on the source to be used to define the next current address from the read only memory). The incrementer 14 can also be loaded in parallel from ground to clear its internal counter.

The ROM address driver 18 is a standard 16 bit register array which can receive its input from the starting address memory portion 7, or current address memory portion 9 via incrementer 14, the output of the address driver 18 being directed to the read only memory, which is of standard design, over bus 19.

The ROM data received from the external read only memory (not shown) is carried over an 8 bit bus 15 via the input drivers and decorder 17. The decoder portion of the driver and decoder section 17 comprises a standard 8 input NOR gate which has the sole function of detecting the end of the table byte (FF) which indicates the end of the plurality of bytes comprising the signal sample stored to define any given tones. The output end of table signal FF is transferred to the timing and control section 50.

The timing and control section 50 comprises a set of 12 flip-flops that work as a ring counter to define the successive states of the controller chip needed to address data in read only memory, and transfer it to the controller chip 1 so that it is accessible for transfer to the PCM bus. The system clock is a simple two-phase clock received over input 52. The other inputs are the frame sync signal 54 and reset signal 56, also received from the bus controller. The frame signal is provided to establish the time frame during which one byte of each of the stored tone signals (64, in the case of the telephony application) is to be received on the ROM data input lines 15 for storage in the buffer memory portion 11, as well as the time in which a sample of tones being transmitted is sent out over the PCM bus to every one of the current destination addresses which may be up to 255 in number.

As has been discussed, the preferred embodiment of the controller chip is for digital telephony. The sampling frequency in telephony is 8 kilohertz. This determines, together with the beat frequency of the dual frequency signals used in all telephony, the number of samples to be stored before the signal to be transmitted begins repeating. Thus it has been calculated that for an R1 telephony system, using any pair of frequencies 700, 900, 1,100, 1,300, 1,500, 1,700, any pair will repeat in 1/100th seconds and therefore 80 samples are stored in the read only memory. For an R2 telephony system which uses any pair of frequencies 1,380, 1500, 1,620, 1,740, 1,860, 1,980, any pair of these will repeat in 1/60th of a second and, therefore, 133 samples are stored for each tone. For a dial tone signal, the pair of frequencies used is 350, 440, the signal repeating in 1/10th of a second therefore requiring 800 samples to be stored. For a busy tone, using the pair of frequencies 480, 520 the signal repeats in 1/20th of a second and 400 samples need to be stored. For a ringback tone, the pair of frequencies to be used is 440, 480 repeating in 1/40th of a second and requiring 200 samples to be stored. Thus the total number of samples needed is 6,500 bytes as calculated above and 48 different multi- frequency tones. This defines the necessary size of the ROM to be used for a standard telephony application.

Of course, this system could be modified to reproduce other signals where samples are stored in the accompanying ROM. For example, voice messages could be reproduced, their length depending on the size of the ROM available for storage. The voice message to be reproduced is generated and transmitted by chaining the samples stored in the ROM.

In order to generate the tone to be transmitted, the samples are stored in the ROM and retrieved one in each frame, frames occuring at a frequency rate of 8 kilohertz. The frame cycle therefore is of 125 microseconds duration. Within each frame, one byte from each of the sample tables stored in the read only memory (ROM) must be transferred from the ROM to the buffer 11. This establishes a maximum pulse width of 1.5 microseconds, which when used for 64 tone signals stored in ROM amounts to 96 microseconds of the 125 microseconds available for each frame. The remaining 29 microseconds of each frame therefore comprises a "wait" state in the system disclosed herein. Each retrieved sample of the 64 signals is stored in the internal buffer memory 32. This is necessary because the read cycle of the read only memory is 250 microseconds, while the allowable time for reading the samples onto the PCM bus is 100 microseconds, as established by outside system constraints. The buffer 11 always contains one byte of data of each of the 64 tones. Whenever a tone sample is to be transferred out, as called for by the origination address arriving from the bus controller 6 bits of the address from the outside bus controller are transferred by the buffer address driver 35 to the buffer address decoder 32, resulting in the output of the currently stored sample of that tone through the drivers 38 onto output bus 39.

Since the tables containing the samples of the tones are stored contiguously in the outside ROM, and since these strings of samples of each tone must repeat themselves within a particular number of samples, the starting address of each known table is stored in the starting address memory 7, so that the controller chip can always return to the correct address of the complete tone being transferred once the final sample is reached. Starting address memory 7 is part of the on chip memory 5 for faster access. In order that the controller chip 1 always knows which ROM address (i.e. sample of a particular tone being transmitted) is currently being read, the current address memory 9 was also provided. Thus after a particular sample of the tone is read from the outside read only memory, the current address as presently stored in current address memory 9 of that particular tone is incremented by incrementer 16 and restored in the appropriate row of current address memory 9 so that the subsequent sample is obtained during the following time frame.

In order to indicate to the controller chip 1 the end of the table of any tone, an identifier byte FF is stored after the last sample of each tone table in the ROM. This byte FF is detected in decoder 17, as discussed above; in response to this end of table signal, the starting address is then immediately sent from the starting address memory 7 via the incrementer 14 to the ROM address drivers 18 in order that the next immediate sample of a stored tone to be chained together is transferred. In response to byte FF, the starting address is both refreshed in the starting address memory RAM 7 but not incremented, and is also stored in the current address RAM 9 to continue to function as the ROM pointer.

It can be seen that the starting address memory 7 and current address memory 9 are both 16 bits, in order to provide an address word of 16 bits thereby addressing 64K bytes of outside ROM. Utilization of the next frame sync pulse on line 54 and the reset pulse on line 56, both of which are received from the outside system which incorporates the controller chip, can now be explained. As to the reset mode, this is provided in order to establish the starting address of every tone of the table stored in the ROM in order to store them in the starting address memory 7. Whenever a reset pulse is received from the outside system, the controller chip calls for the starting addresses of the tone tables, which are stored in the first 128 bytes of the outside memory, and loads them into the starting address memory 7. Thus, on receipt of the reset pulse, the incrementer 14 is cleared; the shift register which functions as the row select circuit 30 is set to select the first row (row 0); and the byte identifying the starting address the first sample of tone 0 is fetched and stored in both the starting address memory 7 and current address memory 9. The control circuit 50, as will be discussed below, then increments the shift register 30 to select the first sample of the next tone, and so on until all 64 addresses have been loaded in starting address memory 7 and current address memory 9.

As designed, the cycle time of operation for handling one tone is equal for both the cases of reset and normal modes of operation.

This system as designed also accommodates the system constraint that the generator cycle must repeat itself after an even number of cycles; that all read functions out of the buffer memory occur on odd numbered clock cycles which has a 250 nanosecond cycle time and that all write operations occur on even numbered cycles of the clock time. Therefore, for a clock cycle time of 250 nanoseconds, the cycle time should be 125 over 64 equal to 1.9 microseconds, and the greatest even number of clock cycles can be used obeying the above constraints is 1.5 microseconds composed of 6 clock cycles. Thus, after completion of transfer of any normal frame, or after accomplishment of the reset mode, consuming a total of 96 microseconds of the 125 microseconds available, the system idles until the synchronizing pulse 54 supplied by the outside system in which the controller chip 1 is incorporated announcing the start of a frame is detected to start a fresh updating process.

In order to understand the sequence of operations of the controller chip, the modes of operation which are provided by the timing and control section 50 will now be reviewed. These modes comprise initialization, normal operating mode, and three special control modes:

frame synchronization (which is necessary to synchronize the controller chip with the outside system in which it is incorporated); wrap around (what happens when the 64th tone stored in ROM has been updated or initialized) and, finally, asynchronous reset (how to set up the chip for initialization). All of these depend on the simple timing and control circuit 50 which comprises a twelve-state ring counter driven by a standard system clock, and a reset flip-flop to keep track of the special states which may be imposed on the controller chip at any time.

In the NORMAL mode of operation, there are twelve states defined by the ring counter: State 1, during which a chip enable signal (ce) is sent to the off chip ROM; a current address is set to the ROM by the ROM address drivers 18; and the same current address is also sent to the incrementer 14 for updating. In states 2, 3, and 4 the controller chip 1 is waiting for the ROM, which as mentioned above operates at a slower rate than the controller chip 1. In state 5, the chip enable signal ce is still sent to the off chip read only memory. It should be noted that this state only has an active function if a tone sample terminator byte FF has been read by decoder 17, in which case a new starting address of the tone must be defined. In this case, the starting address of the completed tone is sent to the off chip ROM and is also sent to the incrementer 14 for storage in the current address memory 9, since the normal incrementer of the current address memory would be inaccurate. States 6, 7, and 8 are again waiting for the ROM. In state 9, the ROM data byte has been written into the data buffer 32 via the input driver 17 and address drivers 35; the starting address is refreshed (which must occur during every frame); and the current address as updated by incrementer 14 is loaded back into current address memory 9. In states 10 and 11, a shift occurs in the row select circuit 30 so that at the start of state 10, the present tone row is enabled for addressing and storage of the next sample thereof, with all other rows being disabled. At the end of state 11, this tone row has been enabled with all other rows being disabled. State 12 has no defined function.

In the initialization mode, in state 1 the chip enable signal ce is sent to the off chip ROM, while the low byte address in the incrementer 14 is also sent to the off chip ROM. States 2, 3 and 4 are again waiting for the off chip ROM states; in state 5, the responses received from the off chip ROM writing the lower byte of a tones starting address into both the starting and current address memories 7 and 9; the high byte address is now sent to the read only memory along with the chip enable ce signal.

The reason for separating transfer of this starting address into two modes in the initialization mode as can be seen is that there are sixteen output address lines from the controller to the off chip ROM driven by the ROM address drivers but only eight lines in return from the off chip ROM to the input drivers 17. States 6, 7 and 8 again are, again, states waiting for the ROM to transfer data; at state 9 the higher byte of the present tones starting address is written into the starting and current address portions of the memory defined by the row select circuit and the incrementer 14 is updated to an address pointing to the next tones low byte starting address. States 10 and 11 are the same as states 10 and 11 of normal operation discussed above as they provide the time wait necessary for the shift register to advance to the next address to be used to store data.

As to the special cases to be considered, the first of these is wrap-around, which occurs after the 64th tone has been updated or initialized. It puts the controller chip to sleep until the next frame sync signal is received on line 54 from the outside system. It requires simply two functions: (1) clearing the 12 states flip-flop register so that no states are being counted; and (2) clearing the reset flip flop which is incorporated in the timing and control section to tell the system that initialization is complete.

The second special case section is a frame synchronization function which occurs one system clock cycle before normal or initialization operation. It consists in responding to receipt of a frame sync pulse from 54, in enabling the first tone row, clearing the wraparound condition; and initializing the control state register. Thus, after the frame sync pulse, state 1 can be executed in response to the next pulse from the system clock on line 52.

A final special case is asynchronous reset which occurs once at startup for setup of initialization and comprises the steps of clearing the control state register; clearing the tone select register 30 so that no tone sample row is being defined; loading the incrementer with the address of the first tones starting address, the low byte portion thereof for transfer in the initialization mode; and resetting the reset flip-flop for the start of the initialization mode.

While the above describes a preferred embodiment of this invention, it is understood that this is capable of variation and modification, and the scope of this patent shall not be limited to the exact details set forth herein, but only as defined by the following claims.

What is claimed:

1. A system for generating and transmitting readily accessible tone signals comprising:
   (a) a read only memory for storing a plurality of digitally encoded tone signals, each signal comprising a finite series of digital signals each representing a sample of the waveform to be transmitted; and
   (b) a controller for retrieving the set of digital samples representing the plurality of said tone signals and transmitting said digital signals on a pulse code modulated time division multiplex data bus to a plurality of defined destinations in response to receipt of origination addresses, said controller further comprising buffer means for storing a sample of each tone signal stored in said ROM and means for responding to origination addresses for substantially simultaneously transmitting any of said tone signals to a plurality of destination addresses.

2. A system for generating and transmitting readily accessible tone signals comprising:
   (a) a read only memory for storing a plurality of digitally encoded tone signals, each signal comprising a finite series of digital signals each representing a sample of the waveform to be transmitted; and
   (b) a controller for retrieving the set of digital samples representing the plurality of said tone signals and transmitting said digital signal on a pulse code modulated time division multiplex data bus to a plurality of defined destinations in response to receipt of origination addresses, said controller further comprising buffer means for storing a sample of each of said tone signals in said read only memory and means responsive to said origination addresses for sending said samples of said stored tone signals simultaneously to a plurality of said destinations.

3. A system, as claimed in claim 1, wherein said read only memory comprises a portion for storing a signal defining the starting address of each of said tone signals, whereby a tone signal may be continuously repeated by said controller in response to said starting address signal and said digital sample signals.

4. A system, as claimed in claim 2, wherein said read only memory comprises a portion for storing a signal defining the starting address of each of said tone signals, whereby a tone signal may be continuously repeated by said controller in response to said starting address signal and said digital sample signals.

5. A system, as claimed in claim 1, wherein said read only memory comprises a portion for storing a signal defining the length of each of said tone signals, whereby a tone signal may be continuously repeated by said controller in response to said length defining signal and said digital sample signals.

6. A system, as claimed in claim 5, said controller further comprising buffer means for storing a sample of each tone signal stored in said ROM, whereby transmission of said sample immediately begins in response to receipt of said origination address.

7. A system, as claimed in claim 1, wherein the sample of each of said tones stored in said buffer means is continuously updated, said buffer means storing every sample of each of said tone signal during each transmission time frame, a transmission time frame being the period of time allowed for transmission of digital samples of any of the tone signals to said plurality of destination addresses.

8. A system, as claimed in claim 5, said controller further comprising memory means for continually storing the starting address of each of the tone signals stored in said read only memory, and the current address of the signal sample currently stored by said buffer means in said controller.

9. A system, as claimed in claim 8, wherein said controller means further comprises an incrementer connected between said starting address memory storage and said current address memory storage, whereby the current address in said current address portion of each of said tones is constantly updated based on the starting address continually stored in said memory.

10. A system, as claimed in claim 9, wherein the output of said current address memory drives said data address portion of said read only memory, the output of said read only memory being supplied to said buffer means of said controller chip, the output of said buffer means being selectively addressed by said origination address for transfer to the outgoing data bus as directed by said destination address.

11. A system, as claimed in claim 10, further comprising means for generating an end of table signal responsive to the completion address stored in said read only memory for each of said tone signals to selectively restart the storage of the starting addresses of each of said tone signals by said controller chip.

* * * * *